(12) United States Patent
Sartorius

(10) Patent No.: US 12,735,196 B2
(45) Date of Patent: Sep. 15, 2026

(54) AIR MOBILITY SYSTEM

(71) Applicant: The Boeing Company, Chicago, IL (US)

(72) Inventor: Thomas Skyler Sartorius, San Luis Obispo, CA (US)

(73) Assignee: The Boeing Company, Arlington, VA (US)

( * ) Notice: Subject to any disclaimer, the term of this patent is extended or adjusted under 35 U.S.C. 154(b) by 78 days.

(21) Appl. No.: 18/885,052

(22) Filed: Sep. 13, 2024

(65) Prior Publication Data

US 2025/0004466 A1 Jan. 2, 2025

Related U.S. Application Data

(63) Continuation of application No. 17/571,873, filed on Jan. 10, 2022, now Pat. No. 12,117,828.

(60) Provisional application No. 63/136,874, filed on Jan. 13, 2021.

(51) Int. Cl.

| | |
|---|---|
| ***B64D 47/00*** | (2006.01) |
| ***B64D 45/00*** | (2006.01) |
| ***G05D 1/00*** | (2006.01) |
| ***G05D 1/226*** | (2024.01) |
| ***G05D 1/46*** | (2024.01) |
| ***G06F 3/16*** | (2006.01) |
| ***G08G 5/20*** | (2025.01) |
| ***H04B 7/15*** | (2006.01) |

(52) U.S. Cl.

CPC ............. *B64D 47/00* (2013.01); *B64D 45/00* (2013.01); *G05D 1/0022* (2013.01); *G05D 1/101* (2013.01); *G05D 1/226* (2024.01); *G05D 1/46* (2024.01); *G06F 3/167* (2013.01); *G08G 5/20* (2025.01); *H04B 7/15* (2013.01)

(58) Field of Classification Search

CPC ...... G05D 1/0022; G05D 1/101; B64D 45/00; B64D 47/00; G06F 3/167; G08G 5/0004; G08G 5/0013; G08G 5/0026; G08G 5/0052; H04B 7/15; H04B 7/18506; B64F 1/00

See application file for complete search history.

(56) References Cited

U.S. PATENT DOCUMENTS

| | | | | |
|---|---|---|---|---|
| 12,379,722 | B1 * | 8/2025 | Nehman | G05D 1/005 |
| 2016/0077523 | A1 * | 3/2016 | Zygmant | G05D 1/0016 701/2 |
| 2017/0365177 | A1 | 12/2017 | Puentes et al. | |
| 2020/0118450 | A1 | 4/2020 | Gariel et al. | |

OTHER PUBLICATIONS

United States Patent and Trademark Office. Non-Final Office Action for U.S. Appl. No. 17/571,873, mailed Jan. 10, 2022, pp. 1-14.

(Continued)

*Primary Examiner* — Michael V Kerrigan

(74) *Attorney, Agent, or Firm* — Joseph M. Butscher; Carroll, Hoette & Butscher, LLC

(57) ABSTRACT

An air mobility system between an aircraft and a companion system includes a data link configured to provide wireless communication between the companion system and the aircraft, where the data link is a set-aside analog channel configured to transmit audio signals that carry voice and data. State information is received by the companion. The state information indicates a basic state of the aircraft.

20 Claims, 7 Drawing Sheets

(56) References Cited

OTHER PUBLICATIONS

United States Patent and Trademark Office. Notice of Allowance and Fee(s) Due for U.S. Appl. No. 17/571,873, mailed Jun. 17, 2024, pp. 1-9.

Valenzuela, Elvia. "First Flight of NASA's 2020 Unmanned Aircraft Demonstration Activities," Apr. 9, 2020, National Aeronautics and Space Administration, retrieved from Internet.

* cited by examiner

AIR MOBILITY SYSTEM

CROSS-REFERENCE TO RELATED APPLICATION

This application claims priority to U.S. Provisional Application No. 63/136,874, filed Jan. 13, 2021, and U.S. application Ser. No. 17/571,873, filed on Jan. 10, 2022, now U.S. Pat. No. 12,117,828. The contents of both applications are incorporated herein by reference in their entirety.

INTRODUCTION

The present disclosure relates to an air mobility system. In particular, the present disclosure is directed towards an air mobility system including a data link between a companion system and an aircraft.

BACKGROUND

Most individuals who have the financial resources to fly a general aviation aircraft only need to travel the appropriate distance a handful of times a year. As a result, it may be difficult for an individual to fly an aircraft frequently enough to keep all of his or her flight skills up to date. For example, it may be challenging even for a certified pilot to stay current on skills such as planning, communication, local knowledge, and other non-stick-and-rudder skills. Indeed, general aviation pilots should fly several times per month in order to stay current with their skills.

There are several approaches currently available for providing private air travel. In one example, air taxi services and on-demand short-notice charter flights may be available in some regions. However, an air taxi operator requires a network of multiple pilots and aircraft, which may be costly to acquire. Indeed, there is significant cost associated with building a fleet of aircraft as well as recruiting and training pilots. Furthermore, many non-revenue miles are spent transporting the pilots and aircraft to locations where they may need to be. For example, there is significant cost in transporting pilots home at night. Finally, smaller aircraft only have a few available seats, and an on-board pilot uses the limited space and weight on the aircraft. In another example of on-demand air travel, an aircraft is provided with an onboard computer that acts as a pilot-in-command or, in the alternative, the pilot-in-command is located on the ground. However, autonomous technology as well as the associated regulatory infrastructure still require significant development before an autonomous aircraft may be used for passenger-carrying revenue operations. Moreover, the equipment required for an autonomous aircraft may be expensive and heavy, and therefore impractical to integrate into a smaller, personal-sized aircraft (which typically includes one to about six seats).

SUMMARY

According to several aspects, an air mobility system between an aircraft and a companion system includes a data link configured to provide wireless communication between the companion system and the aircraft, where the data link is a set-aside analog channel configured to transmit audio signals that carry voice and data. State information is received by the companion. The state information indicates a basic state of the aircraft.

In an aspect, a method for providing wireless communication by an air mobility system between an aircraft and a companion system is disclosed. The method includes enabling, by a companion that is part of the companion system, personalized communication between the aircraft and the companion system over a data link configured to provide the wireless communication between the companion system and the aircraft. The data link is a set-aside analog channel configured to transmit audio signals that carry voice and data and the personalized communication is specific to the aircraft. The method also includes receiving state information by the companion, wherein the state information indicates a basic state of the aircraft.

The features, functions, and advantages that have been discussed may be achieved independently in various embodiments or may be combined in other embodiments, further details of which can be seen with reference to the following description and drawings.

BRIEF DESCRIPTION OF THE DRAWINGS

The drawings described herein are for illustration purposes only and are not intended to limit the scope of the present disclosure in any way.

DETAILED DESCRIPTION

An air mobility system between a companion system and an aircraft is disclosed. The air mobility system includes a data link that carries radio calls, communications, and/or commands generated by the companion system to the aircraft. The data link enables a companion, who is part of the companion system, to act as a remote assistant to a pilot-in-command (PIC) onboard the aircraft. Specifically, the companion performs radio work, commands, and/or other functions on behalf of the PIC onboard the aircraft, while the PIC still maintains full oversight and authority of the operation of the aircraft.

The following description is merely exemplary in nature and is not intended to limit the present disclosure, application, or uses.

Figure 1:
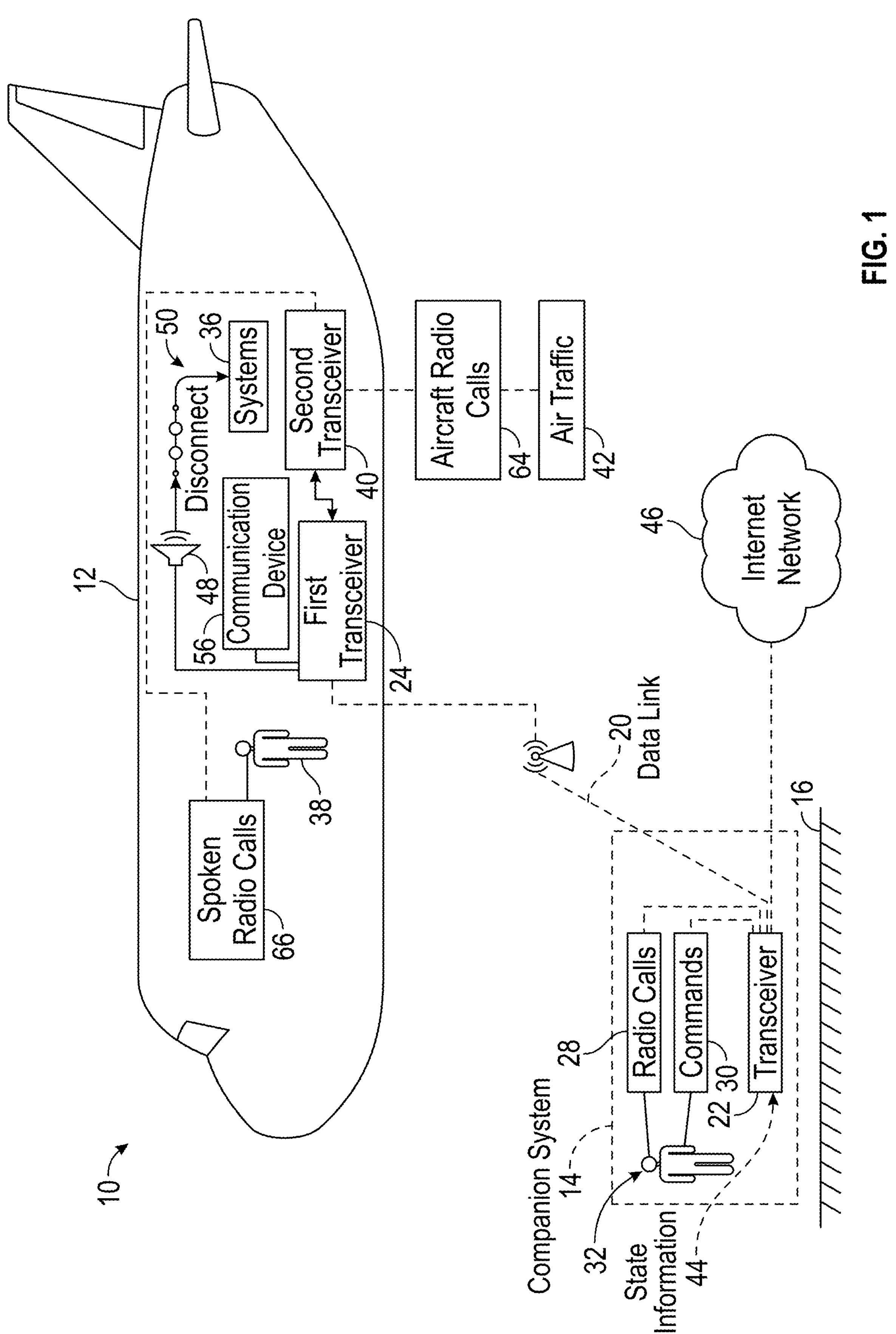
FIG. 1 is a schematic diagram of the disclosed air mobility system including a data link between a companion system and an aircraft, according to an exemplary embodiment.

Referring to FIG. 1, an air mobility system 10 between an aircraft 12 and a companion system 14 is illustrated. The aircraft 12 represents any airplane that is employed in general aviation applications. In the embodiment as shown, the companion system 14 is located on ground 16, however, it is to be appreciated that the companion system 14 is not limited to a location on the ground 16. Instead, for example, the companion system 14 may located on a marine vessel deployed in a body of water. The air mobility system 10 includes a data link 20 configured to provide wireless communication between the companion system 14 on the ground 16 and the aircraft 12. Specifically, the data link 20 wirelessly connects a transceiver 22 that is part of the companion system 14 with a transceiver 24 onboard the aircraft 12. As explained below, the data link 20 carries commands 30 generated by a companion 32 of the companion system 14 to one or more systems 36 onboard the aircraft 12. The data link 20 is also configured to relay radio calls 28 spoken by the companion 32 though the transceiver 24 located onboard the aircraft 12, where the radio calls 28 are relayed by a second transceiver 40 onboard the aircraft 12 to air traffic 42. It is to be appreciated that the data link 20 enables the companion 32 of the companion system 14 to act as a remote assistant to a pilot-in-command (PIC) 38 onboard the aircraft 12. Specifically, the data link 20 allows for the companion 32 to conduct some or all of the operations and radio work on behalf of the PIC 38 onboard the aircraft 12. However, the PIC 38 maintains full oversight and authority of the aircraft 12. In other words, the PIC 38 maintains authority over the various affordances to exercise authority over the aircraft 12 such as, for example, devices for changing the autopilot setting and the equipment for radio calls.

In the non-limiting embodiment as shown in FIG. 1, there is a single companion 32 located on the ground 16 assisting a single PIC 38 onboard an aircraft 12. However, it is to be appreciated FIG. 1 illustrates a single companion system 14 and aircraft 12 for purposes of clarity and simplicity. Instead, in another embodiment, the companion 32 assists more than one PIC 38 of an aircraft. In other words, the companion 32 assists multiple pilots who are each piloting their own respective aircraft. In another embodiment, more than one companion 32 assists more than one PIC 38. For example, a pool of companions 32 assist multiple PICs 38. In one embodiment, the data link 20 provides a constant presence of the companion 32. However, in an alternative embodiment, the data link 20 provides either an intermittent or an on-demand presence of the companion 32. Furthermore, although FIG. 1 illustrates the PIC 38 as an individual or a human, in an alternative embodiment the PIC 38 is an autonomous flight control system or a semi-autonomous flight control system instead. Moreover, although FIG. 1 illustrates the companion 32 as an individual, in another embodiment the companion 32 is autonomous flight control system or a semi-autonomous flight control system instead.

Continuing to refer to FIG. 1, the companion system 14 receives state information 44 that indicates a basic state of the aircraft 12. The basic state of the aircraft 12 includes, but is not limited to, information such as position, altitude, and rate-of-climb. Furthermore, in one embodiment the state information 44 includes additional information such as, but not limited to, a visual image of the cockpit of the aircraft 12, a visual image of an external environment of the aircraft 12, an engine state, and a fuel state. In one embodiment, the state information 44 includes all avionics data, external video, cockpit and cabin video, and cockpit and cabin video information.

In one embodiment, the state information 44 is transmitted from the aircraft 12 to the companion system 14 over the data link 20. It is to be appreciated that the data link 20 is a dedicated link, an intermittent link, or an on-demand link. If the data link 20 is a dedicated link, then the state information 44 is transmitted by a communications protocol such as, but not limited to, satellite communication (SATCOM) or a mobile communication protocol such as 5G. If the data link 20 is an intermittent link or an on-demand link, then the state information 44 is transmitted by a communication protocol such as, for example, a very high frequency (VHF) radio spectrum. In still another embodiment, the state information 44 is transmitted over a separate internet network 46. For example, the companion 32 downloads the state information 44 from a website that is available over the internet, where the website allows for the companion 32 to listen to live air traffic control broadcasts or see aircraft position information.

In one embodiment, the air mobility system 10 further includes an annunciation device 48 and/or a disconnect device 50. The annunciation device 48 and the disconnect device 50 are located onboard the aircraft 12. The annunciation device 48 is in electronic communication with the transceiver 24 and receives the commands 30 generated by the companion 32. The annunciation device 48 is configured to alert the PIC 38 to the commands 30 generated by the companion 32. It is to be appreciated that the PIC 38 may be alerted to the commands 30 by at least one of a tactile, audio, or visual alert. Accordingly, the annunciation device 48 includes at least one of an audio indicator, a visual indicator, and a tactile indicator. In an example, the audio indicator may be a speaker, the visual indicator may be a display for showing text or images, and the tactile indicator may be a device that generates vibration in a seat or the avionics controls. For example, the PIC 38 may hear the commands 30 generated by the companion 32 if the annunciation device 48 is a speaker. Thus, it is not possible to affect a change on the aircraft 12 without the change being annunciated. For example, as seen in FIG. 1, the annunciation device 48 is in series with the disconnect device 50, and the one or more systems 36. In other words, the annunciation device 48 is in line (as opposed to parallel) with the one or more systems 36 that implement the commands 30.

The commands 30 are any type of task that is performed by a PIC in command of an aircraft. Some examples of commands 30 that are generated by the companion 32 include, but are not limited to, changing a frequency of the radio calls 28, changing the transponder squawk codes, changing an autopilot heading or altitude, and changing an altimeter setting. Accordingly, the one or more systems 36 onboard the aircraft 12 include any device or system for executing the commands 30. For example, in one embodiment, the one or more systems 36 include a device that changes the heading and/or altitude settings of the autopilot of the aircraft 12 based on the commands 30 received from the data link 20.

It is to be appreciated that the data link 20 is a non-mission critical link, as there is a qualified PIC 38 onboard the aircraft 12 monitoring the information being sent over the data link 20 (i.e., the radio calls 28 and the commands 30). For example, the PIC 38 is made aware of an alert generated by the annunciation device 48 indicating the command 30. In the embodiment as shown in FIG. 1, the PIC 38 has the ability to reject the command 30. Specifically, the disconnect device 50 is in electronic communication with the one or more systems 36 that execute the commands 30. In one embodiment, the disconnect device 50 is configured to override the commands 30 generated by the companion 32 in response to receiving input from the PIC 38. For example, in one embodiment, the disconnect device 50 enables the PIC 38 to override or cancel a command 30 that instructs the aircraft 12 to change autopilot heading or altitude. In the alternative, the disconnect device 50 is configured to disconnect the aircraft 12 from the companion system 14. In other words, the disconnect device 50 terminates the connection to the data link 20. In one embodiment, the disconnect device 50 is a knob, button, or switch that the PIC 38 manipulates to either modify or disregard a command 30 that is generated by the companion 32. Accordingly, the PIC 38 maintains full authority over the aircraft 12.

Figure 2:
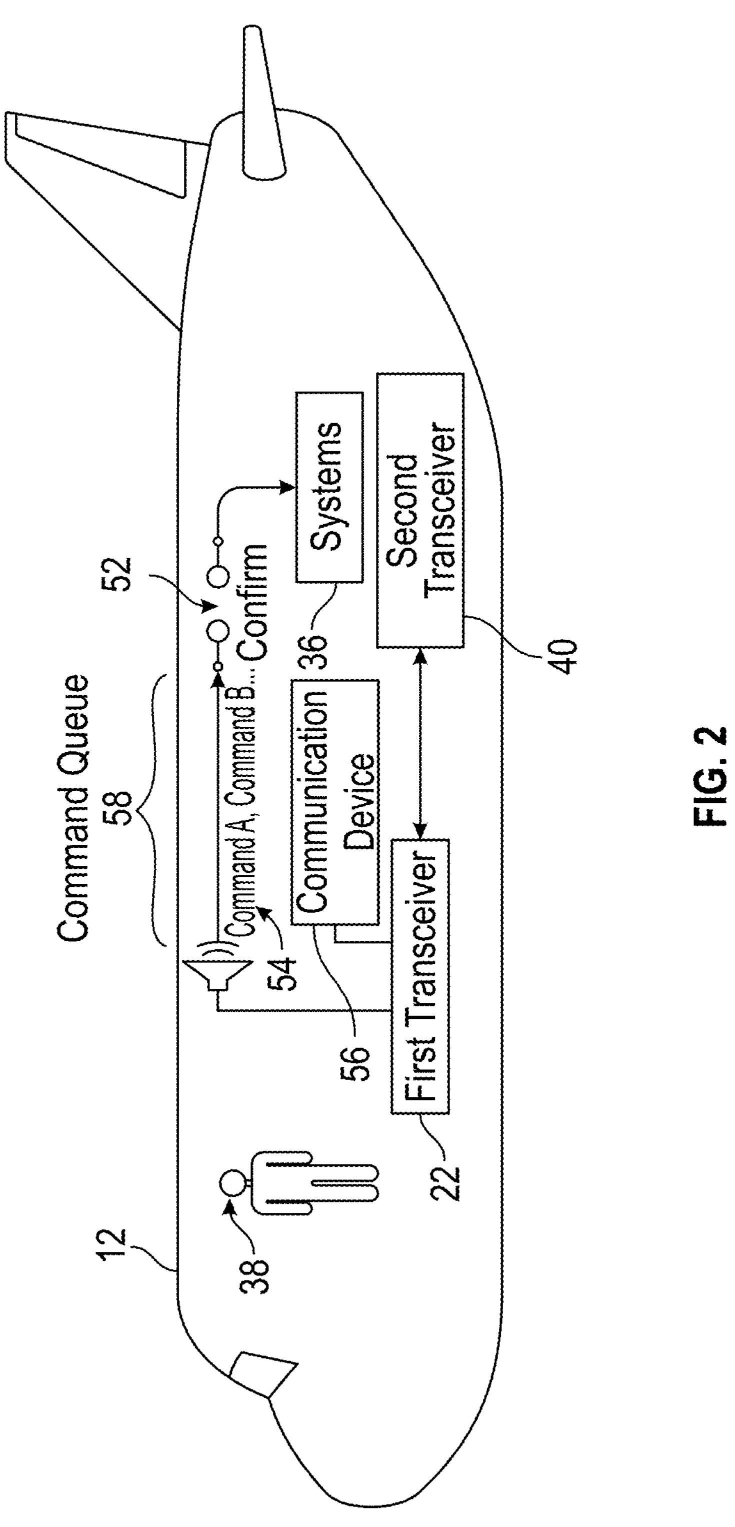
FIG. 2 is a schematic diagram of an alternative embodiment of the aircraft shown in FIG. 1, according to an exemplary embodiment.

Referring to FIG. 2, in an alternative embodiment the air mobility system 10 includes a confirm device 52 onboard the aircraft 12 instead of a disconnect device. The confirm device 52 is in electronic communication with the one or more systems 36 that execute the commands 30. The confirm device 52 is configured to implement one or more pending commands 54 that are part of a command queue 58 in response to receiving a confirmation from the PIC 38. In other words, the commands 30 are not executed by the one or more systems 36 unless there is an affirmative confirmation by the PIC 38. As seen in the exemplary embodiment of FIG. 2, the one or more pending commands 54 include Command A, Command B, and so on, where the pending commands 54 are awaiting confirmation by the PIC 38. The command queue 58 includes the one or more pending commands 54 that are awaiting confirmation by the PIC 38.

Turning back to FIG. 1, in one embodiment, the data link 20 is configured to transmit personalized communication between the companion system 14 and the aircraft 12. It is to be appreciated that the personalized communication is specific to the aircraft 12. For example, the personalized communication may be the companion 32 discussing one of the radio calls 28 or commands 30. The personalized communication is in the form of voice or, in an alternative embodiment, text. In one embodiment, the personalized communication is transmitted over the data link 20 using a voice over internet protocol. In another embodiment, the personalized communication is transmitted over a push-to-talk (PTT) VHF frequency. In yet another embodiment, the personalized communication is transmitted over the data link 20 using cellular frequency. It is to be appreciated that in one embodiment, an alert is generated in response to either the companion 32 or the PIC 38 initiating a personalized communication, similar to a telephone ringing. It is also to be appreciated that in one non-limiting embodiment, the personalized communication is unidirectional. For example, in one approach the data link 20 is configured to transmit one-way personalized communication from the companion system 14 to the aircraft 12 over the data link 20. In the alternative, the data link 20 is configured to transmit one-way personalized communication in the opposite direction from the aircraft 12 to the companion system 14.

As mentioned above, in one embodiment the data link 20 is configured to relay radio calls 28 spoken by the companion 32 through the transceiver 24 located onboard the aircraft 12, where the radio calls 28 are relayed by the second transceiver 40 onboard the aircraft 12 to air traffic 42. In other words, the companion system 14 makes radio calls 28 on the behalf of the aircraft 12. It is to be appreciated that the radio calls 28 are transmitted independently of the commands 30. For example, in one implementation, the companion 32 only assists the PIC 38 with radio calls 28 and does not provide commands 30. It is also to be appreciated that the PIC 38 is made aware of the radio calls 28 spoken by the companion 32. Specifically, the radio calls 28 are announced to the PIC 38 by a communication device 56. The communication device 56 is any device for conveying information to the PIC 38 that is configured to make the PIC 38 aware that a radio call 28 is spoken by the companion 32 on his or her behalf. In an embodiment, the communication device 56 generates audio signals and is a speaker or a headset. However, in another embodiment, the communication device 56 is configured to convey information visually, such as a display that converts the radio calls 28 to text.

In one embodiment, the radio calls 28 are transmitted over the data link 20 using a voice over internet protocol. In another embodiment, the radio calls 28 are transmitted over the data link 20 using an unused VHF frequency, or the same frequency that is used for the personalized communications. In an alternative embodiment, the radio calls 28 are not transmitted over the data link 20 from the companion system 14 to the aircraft 12. Instead, referring to both FIGS. 1 and 3, the transceiver 22 of the companion system 14 is in electronic communication with a ground station 60 (seen in FIG. 3) in proximity to the aircraft 12. The companion system 14 sends the radio calls 28 to the ground station 60. The radio calls 28 are then broadcast to the air traffic 42 without being relayed through the aircraft 12.

Figure 3:
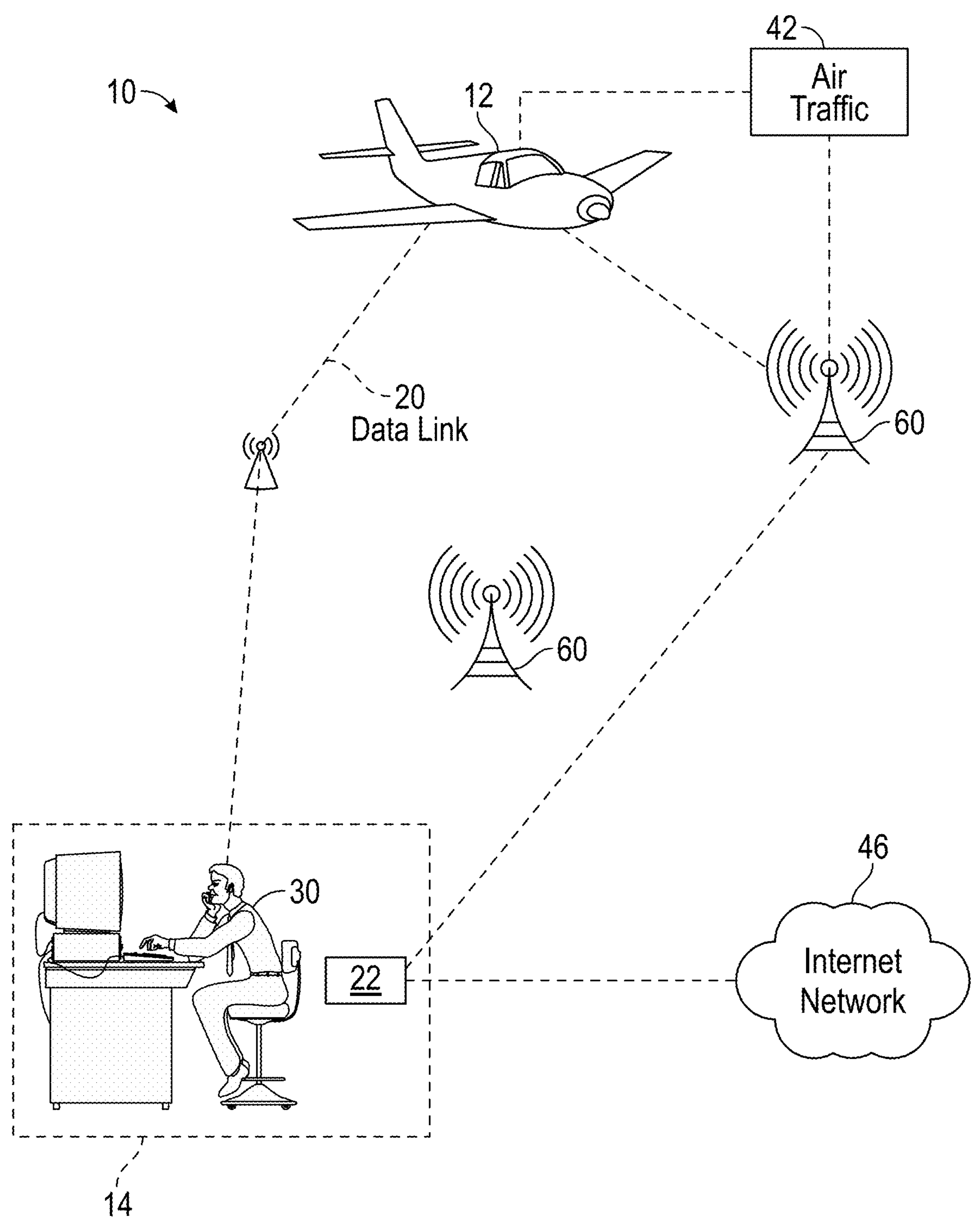
FIG. 3 is a diagram illustrating the air mobility system and one or more ground stations that are used to carry signals, according to an exemplary embodiment.

Referring to FIGS. 1 and 3, in another embodiment, the second transceiver 40 of the aircraft 12 receives aircraft radio calls 64 from the air traffic 42. The aircraft radio calls 64 are relayed from the aircraft 12 to the companion system 14 using a variety of approaches. In one embodiment, the data link 20 relays the aircraft radio calls 64 received by the aircraft 12 to the companion system 14. In this embodiment, the data link 20 employs any number of communication protocols such as, but not limited to, voice over internet protocol or by VHF frequency. Alternatively, instead of the data link 20, the companion system 14 receives the aircraft radio calls 64 from the air traffic 42 through one of the ground stations 60. In another embodiment, the companion system 14 receives the aircraft radio calls 64 over the internet network 46, such as a website that monitors radio calls. Furthermore, in addition to relaying the aircraft radio calls 64 from the air traffic 42 to the companion system 14, the companion system 14 also monitors spoken radio calls 66 as well. It is to be appreciated that the spoken radio calls 66 are generated by the PIC 38 onboard the aircraft 12. In other words, the spoken radio calls 66 are spoken by the PIC 38. For example, in one embodiment, the data link 20 relays the spoken radio calls 66 that are spoken by the PIC 38 to the companion system 14, where the data link 20 may employ a voice over internet protocol or a VHF frequency. Alternatively, in another embodiment, the spoken radio calls 66 are relayed from the aircraft 12 to the companion system 14 through one of the ground stations 60. In still another embodiment, the companion system 14 receives the spoken radio calls 66 over the internet network 46, such as a website that monitors radio calls.

Figure 4:
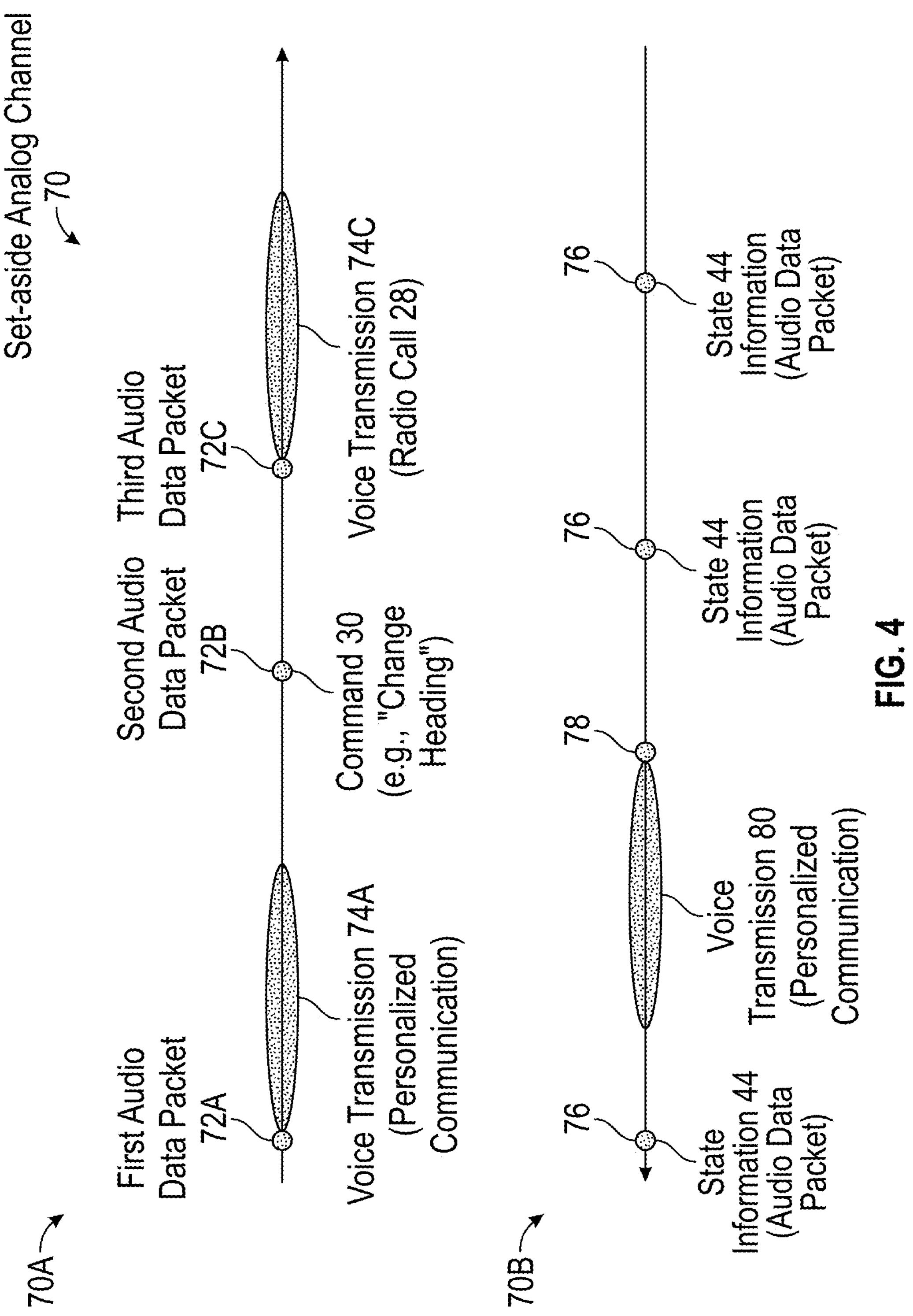
FIG. 4 is a diagram of a set-aside analog channel configured to transmit audio signals that carry data, according to an exemplary embodiment.

Referring to FIG. 4, in at least some implementations, the data link 20 is a set-aside analog channel 70 having limited data capacity that may be used in one direction at a time. For example, in an embodiment, the set-aside analog channel 70 is an aviation VHF channel. However, it is to be appreciated that the set-aside analog channel 70 is not limited to VHF frequencies. The set-aside analog channel 70 is configured to transmit audio signals that carry data (similar to the tones that are heard when employing a dial-up internet connection). For example, in one non-limiting embodiment, controller-pilot data link communications (CPDLC) may be used to transmit audio signals that carry data.

Referring to both FIGS. 1 and 4, in one implementation the set-aside analog channel 70A is transmitted from the companion system 14 to the aircraft 12. In this example, the companion 32 may press a PTT button (not shown in the figures) that enables the personalized communication. It is to be appreciated that the companion 32 may employ separate PTT buttons, where one PTT button is used for normal radio calls and the other PTT button is used to transmit communications via the set-aside analog channel 70A. Alternatively, instead of two separate PTT buttons, a single PTT button having a toggle switch or a software-implemented PTT button may be used as well. The set-aside analog channel 70A transmits a first audio data packet 72A that indicates that the subsequent data or voice transmission 74A is a personalized communication. As seen in FIG. 4, the set-aside analog channel 70A then transmits a second audio data packet 72B that indicates a command 30. In the example as shown in FIG. 4, the command 30 is to change the heading of the aircraft 12. Then, the companion 32 decides to transmit a radio call 28. The companion 32 may press a broadcast PTT button that enables the radio calls 28. Accordingly, the set-aside analog channel 70A transmits a third audio data packet 72C indicating the subsequent voice transmission 74C is radio call 28 to be rebroadcast.

The set-aside analog channel 70B transmits audio signals that carry voice and data from the aircraft 12 to the companion system 14. Specifically, the set-aside analog channel 70B transmits a plurality of audio data packets 76 that each contain the state information 44 of the aircraft 12. The plurality of audio data packets 76 are either transmitted on-demand or intermittently. As seen in FIG. 4, in addition to the audio data packets 76, the set-aside analog channel 70B also transmits an audio data packet 78 indicating the nature of a transmission over the data link 20. For example, the audio data packet 78 of the set-aside analog channel 70B indicates that the subsequent transmission is a personalized communication voice transmission 80 that should be made audible to the companion 32. Similar to the companion 32, the PIC 38 may also press a PTT button that enables the personalized communication, where separate PTT buttons, a single PTT button having a toggle switch, or a software-implemented PTT button. It is to be appreciated that the set-aside analog channel 70 is implemented independently of the radio calls 28 and the commands 30. In other words, in one embodiment the data link 20 transmits the radio calls 28 and/or the commands 30 in addition to carrying voice and data via the set-aside analog channel 70. In the alternative, the data link 20 does not transmit radio calls 28 and commands 30, and only carries voice and data via the set-aside analog channel 70.

Figure 5:
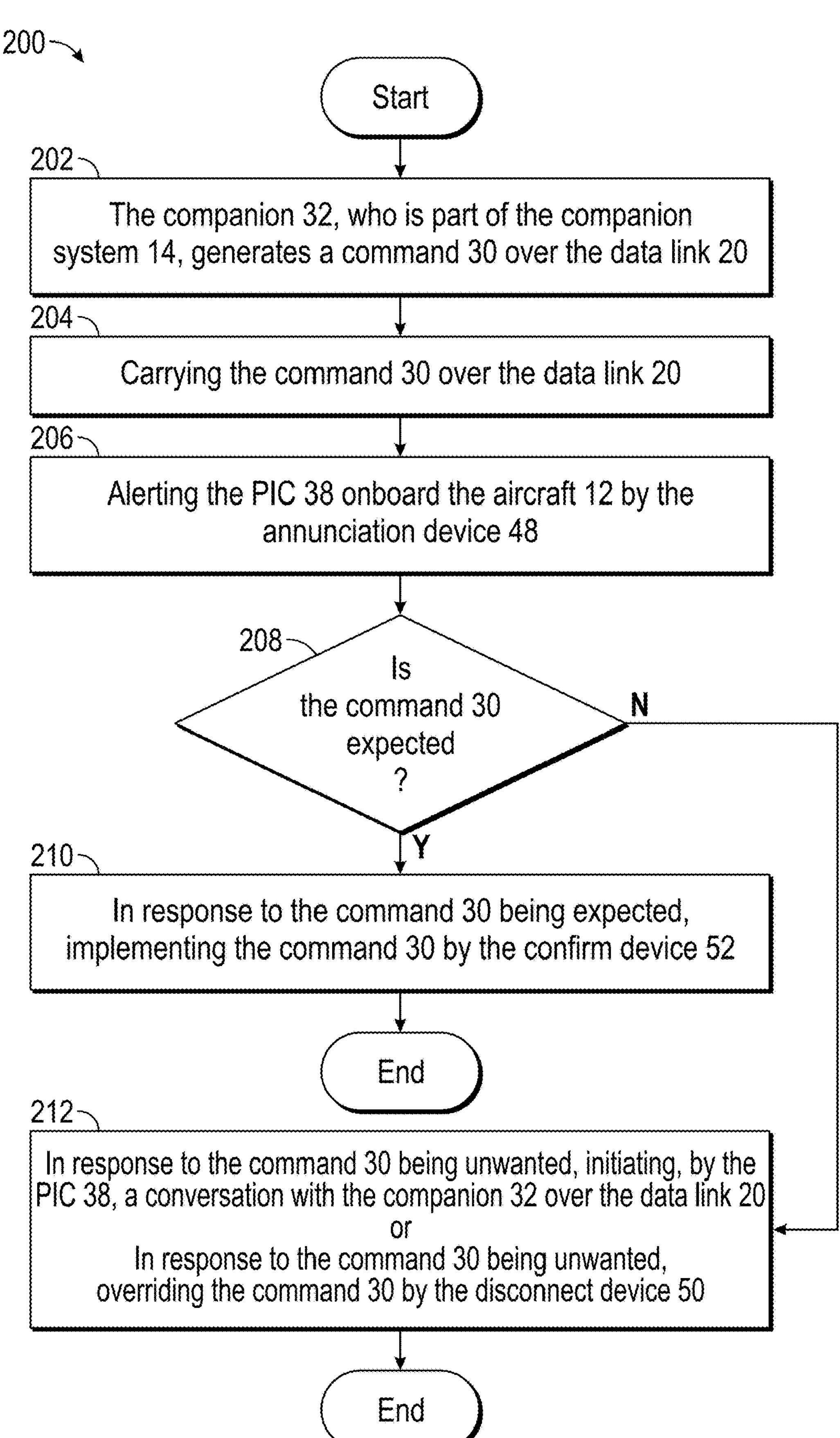
FIG. 5 is a process flow diagram illustrating a method for executing a command by the air mobility system, according to an exemplary embodiment.

FIG. 5 is a process flow diagram illustrating a method 200 for transmitting a command 30 over the data link 20 between the companion system 14 and the aircraft 12 (shown in FIG. 1). Referring to FIGS. 1, 2, and 5, the method 200 begins at block 202. In block 202, the companion 32, that is part of the companion system 14, generates a command 30. For example, the command 30 is to change a heading of the aircraft 12. The method 200 may then proceed to block 204.

In block 204, the command 30 is carried over the data link 20. As mentioned above, the data link 20 is configured to provide wireless communication between the companion system 14 on the ground 16 and the aircraft 12. The method 200 may then proceed to block 206.

In block 206, the annunciation device 48 alerts the PIC 38 onboard the aircraft 12 to the commands 30 generated by the companion 32. As mentioned above, the annunciation device 48 provides at least one of an audio, a visual, and a tactile indicator. The method 200 may then proceed to decision block 208.

In decision block 208, the PIC 38 determines if the command 30 is expected. If the command 30 is expected, then the method 200 proceeds to block 210.

In block 210, in response to the command 30 being expected, the command 30 is implemented by the confirm device 52 (shown in FIG. 2). The command 30 is executed by the one or more systems 36 onboard the aircraft 12. For example, if the command 30 is to change the heading of the aircraft 12, then the new heading is set in autopilot. The method 200 may then terminate.

Returning to decision block 208, if the PIC 38 determines that the command 30 is unexpected or unwanted, then then method 200 proceeds to block 212.

In block 212, in response to the command 30 being unwanted, the PIC 38 initiates a conversation with the companion 32 over the data link 20. For example, the PIC 38 may initiate personalized communication over the data link 20. This situation may occur if the PIC 38 does not suspect nefarious actions by the companion 32, but simply disagrees with the command 30. Alternatively, in response to the command 30 being unwanted, the command 30 is overridden by the disconnect device 50. For example, in one embodiment, if the PIC 38 suspects nefarious actions by the companion 32, then the disconnect device 50 disconnects from the companion affordances. The method 200 may then terminate.

Figure 6:
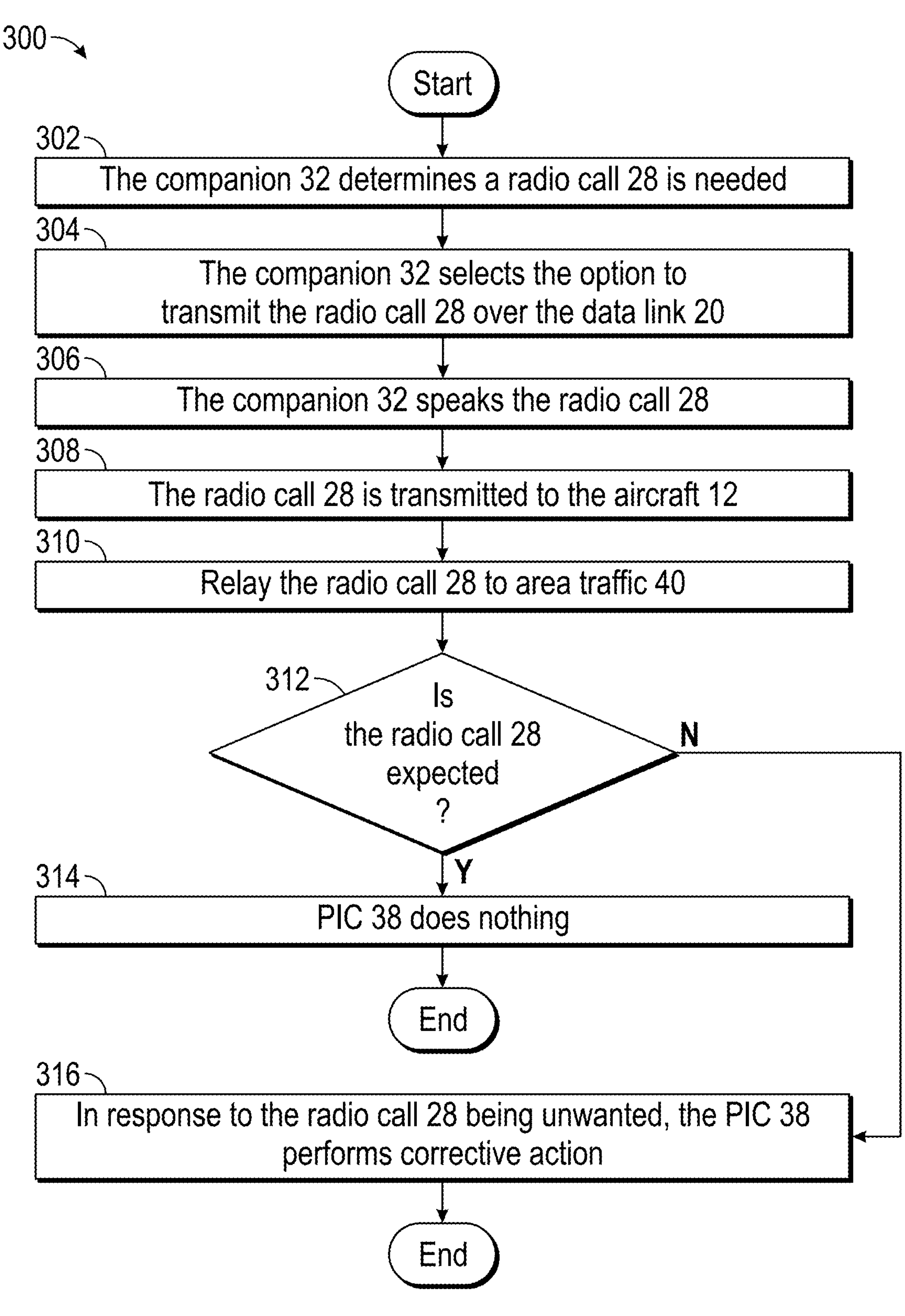
FIG. 6 is a process flow diagram illustrating a method for relaying a radio call, according to an exemplary embodiment.

FIG. 6 is a process flow diagram illustrating a method 300 for relaying radio calls 28 by the companion system 14 through the aircraft 12 via the data link 20. Referring to FIGS. 1, 2, and 6, the method 300 begins at block 302. In block 302, the companion 32 determines a radio call 28 is required. The method 300 may then proceed to block 304.

In block 304, the companion 32 selects the option to transmit the radio call 28 over the data link 20. For example, in one embodiment, the companion 32 may push the PTT button in combination with a broadcast button (PTT+B). The method 300 may then proceed to block 306.

In block 306, the companion 32 speaks the radio call 28. The method 300 may then proceed to block 308.

In block 308, the radio call 28 is transmitted to the aircraft 12 over the data link 20. The method 300 may then proceed to block 310.

In block 310, the second transceiver 40 relays the radio calls 28 to the air traffic 42, and the communication device 56 makes the PIC aware that the radio call 28 is spoken by the companion 32 on his or her behalf. The method 300 may then proceed to decision block 312.

In decision block 312, if the radio call 28 is expected, then then method 300 proceeds to block 314, where the PIC 38 does nothing, and the method 300 then terminates. However, if the radio call 28 is unwanted or unexpected, then the method 300 may proceed to block 316.

In block 316, in response to the command 30 being unwanted, the PIC 38 performs one or more corrective actions. If the PIC 38 does not suspect nefarious actions by the companion 32, but simply disagrees with the command 30, then the PIC 38 may initiate a conversation with the companion 32 over the data link 20. For example, the PIC 38 may initiate personalized communication over the data link 20. However, if the PIC 38 suspects nefarious activity by the companion system 14, then the PIC 38 instructs the disconnect device 50 to disconnect from the companion affordances. The method 300 may then terminate.

Figure 7:
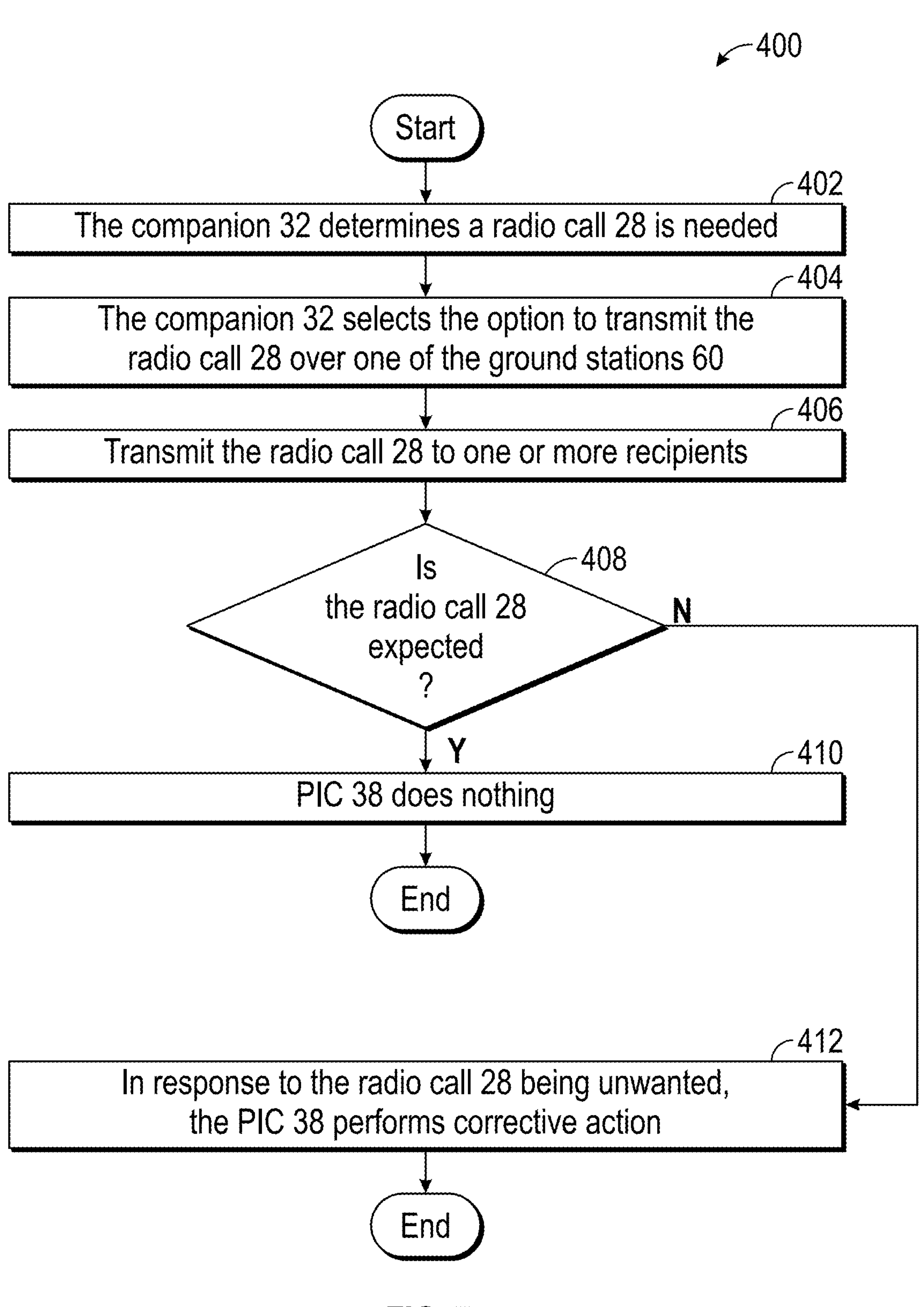
FIG. 7 is a process flow diagram illustrating an alternative method for relaying a radio call, according to an exemplary embodiment.

FIG. 7 is a process flow diagram illustrating a method 400 for relaying radio calls 28 by the companion system 14 through the aircraft 12 via one of the ground stations 60. Referring to FIGS. 1, 2, and 7, the method 400 begins at block 402. In block 402, the companion 32 determines a radio call 28 is required. The method 400 may then proceed to block 404.

In block 404, the companion 32 selects the option to transmit the radio call 28 over one of the ground stations 60. The method 400 may then proceed to block 406.

In block 406, the radio call 28 is transmitted by one of the ground stations 60 to one or more recipients. For example, in an embodiment, the one or more recipients are the air traffic 42. The method 400 may then proceed to decision block 408.

In decision block 408, if the radio call 28 is expected, then then method 400 proceeds to block 410, where the PIC 38 does nothing, and the method 400 then terminates. However, if the radio call 28 is unwanted or unexpected, then the method 400 may proceed to block 412.

In block 412, in response to the command 30 being unwanted, the PIC 38 performs one or more corrective actions. As mentioned above, when the PIC 38 does not suspect nefarious actions by the companion 32, but simply disagrees with the command 30, the PIC 38 initiates a conversation with the companion 32 over the data link 20. In the alternative, if the PIC 38 suspects nefarious activity by the companion system 14, then the PIC 38 instructs the disconnect device 50 to disconnect from the companion affordances. The method 400 may then terminate.

Referring generally to the figures, the disclosed air mobility system provides various technical effect and benefits. Specifically, the disclosed air mobility system provides a cost-effective approach for providing a remote assistant for general aviation pilots who are qualified to fly an aircraft but are still relatively inexperienced or who do not fly frequently enough to keep their skills up-to-date. The disclosed air mobility system is also relatively easy to implement as well. Furthermore, the air mobility system also provides a pilot with turn-by-turn navigation in the air and on the ground. As a result, it is not necessary for the pilot to be familiar with an airport before landing the aircraft. In one implementation, the companion may perform most or all of the radio work that is traditionally performed by the pilot as well. Although a substantial amount of work is offloaded to the companion, the PIC of the aircraft still maintains authority over the aircraft. Accordingly, it is to be appreciated that the pilot may be a qualified but relatively inexperienced pilot or a pilot who does not fly frequently enough to keep his or her skills up to date, and the companion assists the pilot. However, it is to be appreciated that the disclosed air mobility system is not limited to any specific situation and may be used in a variety of different circumstances and applications.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An air mobility system between an aircraft and a companion system, the air mobility system comprising:

a data link configured to provide wireless communication between the companion system and the aircraft, wherein the data link is a set-aside analog channel configured to transmit audio signals that carry voice and data; and state information that is received by the companion system, wherein the state information indicates a basic state of the aircraft, and wherein the state information includes a first visual image of a cockpit of the aircraft, a second visual image of an external environment of the aircraft, an engine state of the aircraft, and a fuel state of the aircraft.

2. The air mobility system of claim 1, wherein the set-aside analog channel is transmitted from the companion system to the aircraft.

3. The air mobility system of claim 2, wherein the set-aside analog channel transmits a first audio data packet that indicates that a subsequent data transmission or a subsequent voice transmission is a personalized communication that is specific to the aircraft.

4. The air mobility system of claim 3, wherein the set-aside analog channel transmits a second audio data packet that indicates a command that is performed by a pilot-in-command (PIC) of the aircraft.

5. The air mobility system of claim 1, wherein the set-aside analog channel is transmitted from the aircraft to the companion system.

6. The air mobility system of claim 5, wherein the set-aside analog channel transmits a plurality of audio data packets that each contain the state information of the aircraft.

7. The air mobility system of claim 1, wherein the set-aside analog channel transmits an audio data packet that indicates a nature of a transmission over the data link.

8. The air mobility system of claim 1, wherein the set-aside analog channel transmits the audio signals in one direction at a time.

9. The air mobility system of claim 1, wherein the set-aside analog channel is an aviation VHF channel.

10. The air mobility system of claim 1, wherein the set-aside analog channel is configured to relay radio calls spoken by a companion that is part of the companion system.

11. The air mobility system of claim 10, wherein the set-aside analog channel is configured to carry commands generated by the companion.

12. The air mobility system of claim 1, wherein the set-aside analog channel is configured to only transmit the audio signals that carry the voice and the data.

13. The air mobility system of claim 1, wherein the state information includes all avionics data, external video, cockpit and cabin video, and cockpit and cabin video information.

14. A method for providing wireless communication by an air mobility system between an aircraft and a companion system, the method comprising:

enabling, by a companion that is part of the companion system, personalized communication between the aircraft and the companion system over a data link configured to provide the wireless communication between the companion system and the aircraft, wherein the data link is a set-aside analog channel configured to transmit audio signals that carry voice and data and the personalized communication is specific to the aircraft; and receiving state information by the companion system, wherein the state information indicates a basic state of the aircraft, and wherein the state information includes a first visual image of a cockpit of the aircraft, a second visual image of an external environment of the aircraft, an engine state of the aircraft, and a fuel state of the aircraft.

15. The method of claim 14, wherein the method further comprises:

transmitting the set-aside analog channel from the companion system to the aircraft.

16. The method of claim 15, wherein the method further comprises:

transmitting, by the set-aside analog channel, a first audio data packet that indicates that a subsequent data transmission or a subsequent voice transmission is the personalized communication.

17. The method of claim 16, wherein the method further comprises:

transmitting, by the set-aside analog channel, a second audio data packet that indicates a command that is performed by a PIC of the aircraft.

18. The method of claim 14, wherein the method further comprises:

transmitting the set-aside analog channel from the aircraft to the companion system.

19. The method of claim 18, wherein the method further comprises:

transmitting, by the set-aside analog channel, a plurality of audio data packets that each contain the state information of the aircraft.

20. The method of claim 14, wherein the state information includes all avionics data, external video, cockpit and cabin video, and cockpit and cabin video information.

* * * * *